United States Patent

Asai et al.

[11] 3,865,469
[45] Feb. 11, 1975

[54] LIQUID CRYSTAL DISPLAY DEVICE

[75] Inventors: Komei Asai, Hirakata; Masakazu Fukai, Nishinomiya; Akio Moriyama, Katano, all of Japan

[73] Assignee: Matsushita Electric Industrial Co., Ltd., Osaka, Japan

[22] Filed: Jan. 3, 1974

[21] Appl. No.: 430,508

[30] Foreign Application Priority Data
Jan. 18, 1973 Japan.................. 48-8789

[52] U.S. Cl............................ 350/160 LC
[51] Int. Cl............................ G02f 1/16
[58] Field of Search................ 350/160 LC

[56] References Cited
UNITED STATES PATENTS
3,551,026  12/1970  Heilmeier ............... 350/150
3,703,329  11/1972  Castellano ............. 350/150

Primary Examiner—Edward S. Bauer
Attorney, Agent, or Firm—Stevens, Davis, Miller & Mosher

[57] ABSTRACT

The present invention relates to a liquid crystal display device with dichromatic display ability wherein liquid crystal is interposed in a spacing between a pair of spaced glass substrates, an inner surface of one of the glass substrates being formed with a transparent thin film electrode while an inner surface of the other glass substrate being formed with dyed metal oxide thin film layer such as dyed aluminum oxide. A transparent thin film electrode is disposed on the dyed metal oxide thin film layer and a voltage is applied across the electrode for effecting dichromatic displaying.

4 Claims, 3 Drawing Figures

LIQUID CRYSTAL DISPLAY DEVICE

The present invention relates to a liquid crystal display device with dichromatic display ability.

Figure 1:
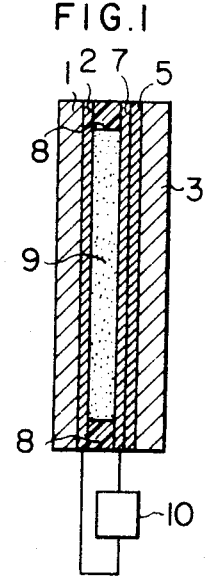
Figure 2:
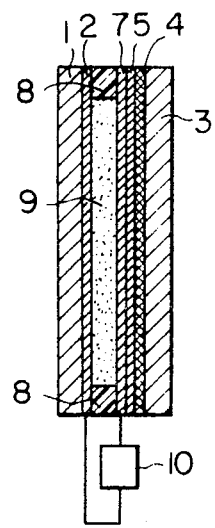
Figure 3:
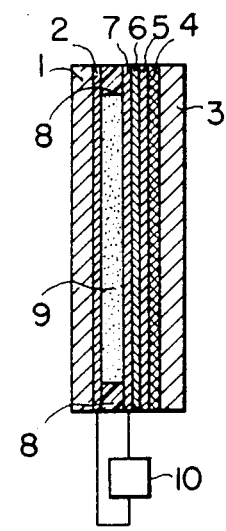

The present invention will now be described in detail with reference to the particular embodiments thereof illustrated in the accompanying drawings, in which:

FIG. 1 is a schematic sectional view of the construction of a transmission type liquid crystal display device in accordance with the present invention, and FIGS. 2 and 3 show the constructions, in section, of reflection type liquid crystal display devices.

In the drawings the reference numeral 1 designates a glass substrate, 2 a transparent thin film electrode disposed on the glass substrate 1, which is formed, for example, mainly of indium oxide, tin oxide, etc. and formed in a pattern as required. 3 designates a glass substrate, 4 a thin film of aluminum vapor-deposited on the glass substrate 3. A surface portion of or entire aluminum thin film 4 is oxidized to form a transparent layer of aluminum oxide 5. The aluminum oxide layer 5 is dyed with suitable dyestuff. On a surface of the aluminum oxide layer 5, a transparent, electrically insulative thin film 6 may be formed for the purpose of the protection of the dyestuff. The thin film 6 can be prepared by vapor-deposition of magnesium fluoride, cerium oxide, glass, silicon oxide, titanium oxide, etc. 7 designates a transparent thin film electrode formed on the aluminum oxide layer 5 or on the thin film 6, which electrode 7 is formed, for example, mainly of indium oxide or tin oxide and may be formed in a pattern as required, as in the case of the transparent thin film electrode 2.

8 designates an electrically insulative spacer for separating the glass substrates 1 and 3, which has the thickness of several to several tens microns. Liquid crystal 9 is interposed in the gap therebetween. In order to drive the liquid crystal display panel, a voltage is applied from a voltage source 10 across the electrodes 2 and 7. The entire electrode 2 including the surface thereof and the entire electrode 7 including the surface thereof can be covered with transparent, electrically insulative thin film of cerium oxide, titanium oxide, magnesium fluoride, glass, silicon oxide, etc. as required. The provision of the transparent, electrically insulative thin film facilitates the orientation of liquid crystal molecules along a given direction over the entire surface of the liquid crystal display panel.

The transparent, dyed layer 5 of aluminum oxide is prepared in the following manner: Firstly, aluminum 4 is vapor-deposited on the glass substrate 3, which is then anodically oxidized in, for example, aqueous solution containing 1.5 – 3.0 percent of oxalic acid at D.C. 5–20 volts to form a transparent aluminum oxide coating. Then, the anodically oxidized aluminum oxide is dyed in a conventional manner. Dyes of any color are known to be used for this purpose. For the sake of convenience of the explanation, let us assume that the transparent aluminum oxide is dyed in light blue. The method of dyeing the transparent aluminum oxide film in blue color is now explained.

Blue dye, for example "Aluminum Blue LLW" manufactured by Sand Co. Ltd., is dissolved in distilled water at 0.1 g/l and conditioned to pH 3–4.5 using caustic soda and acetic acid to prepare dyeing bath. The dyeing bath is then kept at 60°C and the transparent aluminum oxide is dipped therein for 2–10 minutes for dyeing. It is then sealed in boiled water before the completion of the process.

Liquid crystal is sandwiched between the electrodes under homeotropic, homogeneous and twisted alignments because of the effective utilization of absorption anisotropy of included dichromatic dyestuff. These alignments refer, respectively, to perpendicular, parallel and twisted alignments of the longmolecular axis with respect to electrode surfaces. Homeotropic sample may be selected in case of using nematic liquid crystal with negative dielectric anisotropy. For example,

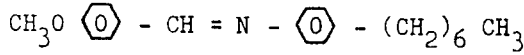
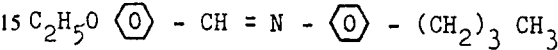
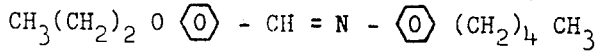

are mixed at the weight ratio of 1:1:1, to which mixture an additive for giving the homeotropic alignment e.g. cetyl gallate is added at 1–4 percent by weight with respect to said mixture. Any method other than by adding the additive may be used in order to produce the homeotropic alignment.

There are many dichromatic dyes known, of which

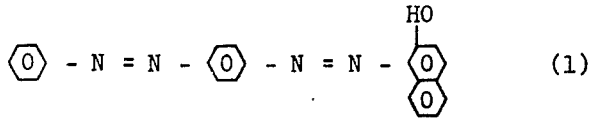

is given as a typical example. The dye (1) is colorless when viewed along longitudinal axis of the molecules and red when viewed along lateral axis of the molecules. Accordingly, when about 1 percent of the dye (1) has been added thereto, the entire liquid crystal display panel appears in blue or violet. Then, if an electric signal having such a voltage and a frequency that dynamic light scatter will not occur and which is higher than the rearrangement threshold voltage is applied to the liquid crystal display panel, the liquid crystal molecules (and hence coloring molecules) incline more or less toward a direction parallel to the substrate plane so that the display panel colors in red-violet or red. That is, for the indication purpose, it can change its color from blue (or violet) to red-violet (or red) in response to turn ON and OFF of the electric signal.

An example of the homogeneous sample can be prepared by using the mixture of

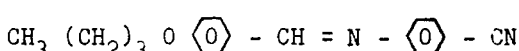
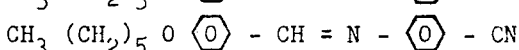
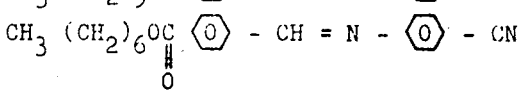

at the ratio of 1:1:1 by weight, each of which has positive dielectric anistrophy ($\epsilon_{\parallel} - \epsilon_{\perp} > 0$). To this mixture 1 percent of the dye (1) is added. When the surfaces including the electrodes 2 and 7 are rubbed with cotton cloth in a given direction and the liquid crystal is filled, the liquid crystal exhibits homogeneous alignment and the display panel colors in red or red-violet under no electric field. If a voltage is applied to the display panel for erecting the liquid crystal molecules perpendicularly to the electrode plane, the display panel appears blue or violet.

In the prior art such dichromatic display was attained by mixing voltage sensitive dye and voltage insensitive dye, or two or more kinds of voltage sensitive dyes having different color phase. The present invention provide a dichromatic display device which includes one kind of voltage sensitive dye and a dyed aluminum oxide layer. Thus, it is easy to manufacture and can provide distinct dichromatic display and hence worthwhile in industrial standpoint.

What is claimed is:

1. A liquid crystal display device comprising;
   a pair of spaced glass substrates,
   liquid crystal including pleochromatic dye interposed between said glass substrates,
   a transparent thin film electrode disposed on an inner surface of one of said glass substrates,
   a dyed metal oxide thin film layer disposed on an inner surface of the other of said glass substrate,
   a transparent thin film electrode disposed on said metal oxide thin film layer, and
   means for externally applying voltage across said transparent thin film electrodes.

2. A liquid crystal display device as defined in claim 1 wherein;
   said metal oxide thin film layer is a dyed aluminum oxide layer.

3. A liquid crystal display device wherein the dyed aluminum oxide layer of claim 2 is formed by vapor depositing aluminum on the glass substrate and anodically oxidizing it to form porous aluminum oxide thin film, impregnating dye thereinto and sealing it in boiling water.

4. A liquid crystal display device wherein on the metal oxide thin film layer of the claim 1 there is formed a transparent electrically insulative thin film for protecting the dye in the metal oxide thin film layer.

* * * * *